United States Patent [19]

Hamada et al.

[11] Patent Number: 4,989,958
[45] Date of Patent: Feb. 5, 1991

[54] FOCUS ADJUSTING APPARATUS PROVIDED WITH A FOCUS LENS MEMBER FORMED OF POLYMER GEL SUBSTANCE HAVING ELECTRO-REACTIVE DEFORMABILITY

[75] Inventors: Yuji Hamada; Takanori Fujii; Masakazu Sakata, all of Hirakata; Yoshitaka Nishio, Moriguchi; Yoshikazu Tsujino, Sakai; Kazuhiko Kuroki, Uji; Yukinori Kuwano, Katano, all of Japan

[73] Assignee: Sanyo Electric Co., Ltd., Moriguchi, Japan

[21] Appl. No.: 266,452

[22] Filed: Nov. 2, 1988

[30] Foreign Application Priority Data

Nov. 5, 1987 [JP] Japan .................. 62-279613

[51] Int. Cl.$^5$ .................. G02B 3/14; G02B 1/06; G02B 15/00
[52] U.S. Cl. .................. 350/419
[58] Field of Search .................. 350/418, 419, 423

[56] References Cited

U.S. PATENT DOCUMENTS 4,407,567 10/1983 Michelet et al. .................. 350/419 X
4,444,471  4/1984 Ford, Jr. et al. .................. 350/419 X
4,784,479 11/1988 Ikemori .................. 350/419 X

FOREIGN PATENT DOCUMENTS 2389144 12/1978 France .................. 350/419
61/10814  3/1986 Japan .
62-151824  7/1987 Japan .................. 350/419

Primary Examiner—Scott J. Sugarman
Attorney, Agent, or Firm—Armstrong, Nikaido, Marmelstein, Kubovcik & Murray

[57] ABSTRACT

A focus adjusting apparatus comprises a focus lens device provided in an optical system. The focus lens device comprises a transparent container of a rectangular prism form, a lens member supported in the container and formed of poly(acrylic amide) gel as a polymer gel substance having electro-reactive deformability, and a pair of transparent electrodes, the container being filled with water-aceton mixture solution. The lens member is formed by two lens materials having different proportions of acrylic acid group. A voltage is applied to the transparent electrodes under control of an automatic focusing circuit to cause electric field in the container, whereby the lens member is deformed in a concentric spherical form to form a lens. When the application of the voltage is stopped, the lens member returns to the initial form. A focal distance of the lens member is changed according to degrees of such deformation of the lens member.

9 Claims, 2 Drawing Sheets

FOCUS ADJUSTING APPARATUS PROVIDED WITH A FOCUS LENS MEMBER FORMED OF POLYMER GEL SUBSTANCE HAVING ELECTRO-REACTIVE DEFORMABILITY

BACKGROUND OF THE INVENTION

1. Field of the Invention

The present invention relates to focus adjusting apparatus and particularly to a focus adjusting apparatus for use in an image sensing apparatus such as a video camera having an optical system provided with focus lens means including a lens member formed of a polymer gel substance having electro-reactive deformability.

2. Description of the Prior Art

Conventionally, focus adjustment in an image sensing apparatus such as a video camera is effected by moving a plurality of lenses by a motor. Such a conventional focus adjusting apparatus is disclosed for example in Japanese Patent Publication No. 10814/1986.

However, such a conventional focus adjusting apparatus requires complicated mechanisms for moving plural lenses and a motor as a power source and, therefore, the apparatus can not be made to have a small size and a light weight and in addition it consumes a large quantity of electric power.

On the other hand, focus adjusting apparatus using liquid crystal as a lens material have been proposed. One of such apparatus is disclosed in U.S. Pat. No. 4,037,929, which indicates a technique for changing a focal distance without deforming the lens, utilizing a property of liquid crystal that its refractive index changes dependent on application of control voltage. However, according to this technique, the refractive index n of the liquid crystal lens is changed only by $\Delta n = 0.2$ or so at the maximum and the focal distance can not be reduced sufficiently. In other words, it is theoretically possible to manufacture a focus adjusting apparatus using a liquid crystal lens but difficulties are involved in practically realizing such apparatus because it is necessary to change the refractive index to a large extent.

Further, a focus adjusting apparatus using piezo ceramic as a lens material has been proposed as in U.S. Pat. No. 3,614,456. According to this patent, a thin cylindrical piezo ceramic in a container expands due to application of control voltage and the liquid in the container is pressurized to cause a thin film at the opening of the container to curve like a convex lens, whereby a lens is formed. However, a range of contraction or expansion due to voltage applied to the piezo ceramic is only from several tens of $\mu m$ to about 100 $\mu m$ at most and it is considered to be difficult for the thin film to form, by the deformation of such extent, a lens enabling an in-focus condition. Accordingly, although it is also theoretically possible to manufacture a focus adjusting apparatus using a lens making use of deformation of piezo ceramic, much difficulty will be involved in practically realizing such apparatus.

SUMMARY OF THE INVENTION

Therefore an object of the present invention is to provide a focus adjusting apparatus in which an optical system can be made small-sized and lightweight.

Another object of the present invention is to provide a focus adjusting apparatus in which consumption of electric power can be reduced.

Briefly stated, the present invention is a focus adjusting apparatus comprising an optical system including focus lens means formed of a polymer gel substance having electro-reactive deformability, and drive means for driving the focus lens means.

According to another aspect of the present invention, the focus lens means comprises a transparent container, a focus lens member formed of a polymer gel substance and fixed in the transparent container so that its optical axis coincides with that of the optical system, a pair of transparent electrodes provided in the transparent container, facing front and back surfaces of the focus lens member, and an organic solution with which the transparent container is filled.

According to another aspect of the invention, the focus lens member deforms like a concentric sphere when voltage is applied thereto by the transparent electrodes and returns to the initial form when the application of the voltage is stopped.

Main advantages of the present invention are as described below. Since focus adjustment is effected by deformation of the focus lens member formed of a polymer gel substance having electro-reactive deformability such as poly(acrylic amide) gel, a complicated mechanism or a drive power source such as a motor for movement of the lens are not required and thus it is made possible to decrease the size and weight of the apparatus and to reduce consumption of electric power.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
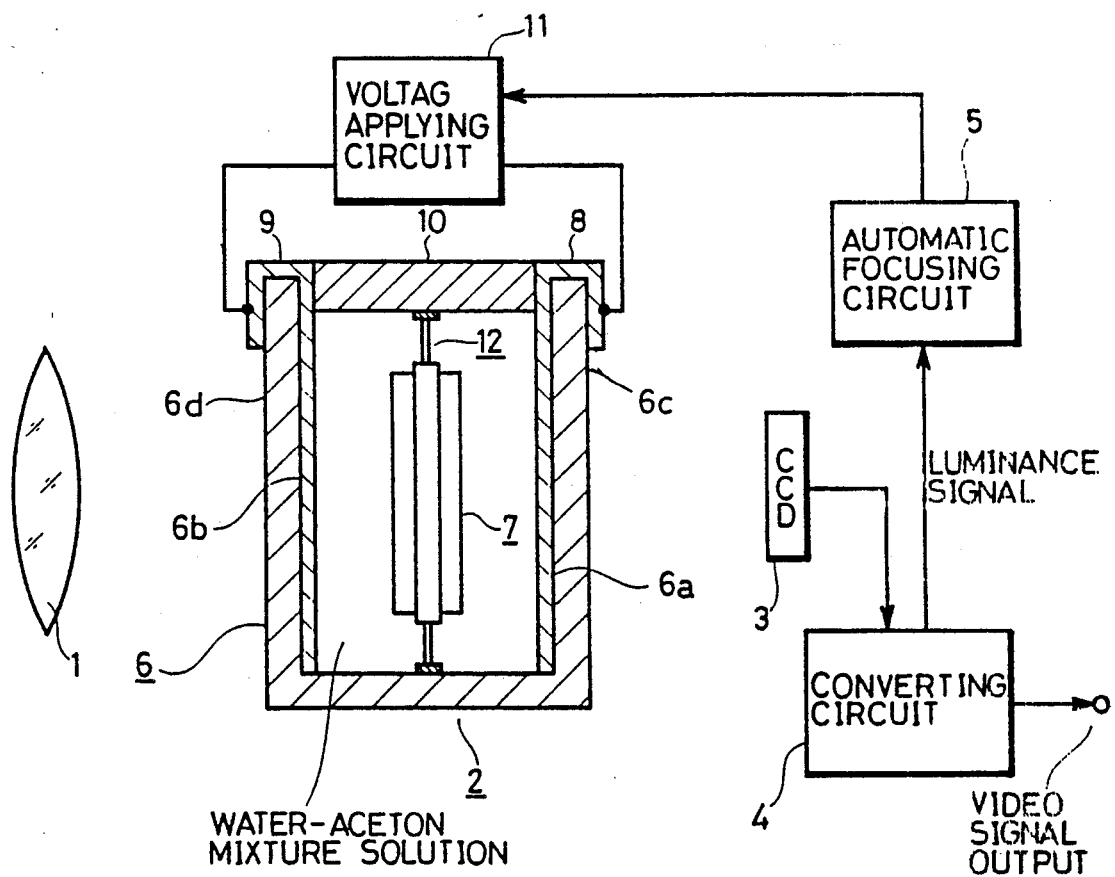
FIG. 1 is a block diagram showing a focus adjusting apparatus according to an embodiment of the invention.

FIG. 1 is a block diagram showing a focus adjusting apparatus according to an embodiment of the invention. Referring to FIG. 1, a lens 1 for sensing image and a focus lens device 2 constitute an optical system, and a charge coupled device (CCD) 3 as a solid state image sensor converts an image formed by the optical system to an electric signal. The signal obtained from the CCD 3 is converted to a predetermined video signal, e.g., a luminance signal and a modulation chroma signal (or two color difference signals) in the NTSC system by a converting circuit 4 and those signals are outputted therefrom. The luminance signal out of the predetermined video signal from the converting circuit 4 is supplied to an automatic focusing circuit 5 and this circuit 5 controls the focus lens device 2 so that a high-frequency component of the input luminance signal is constantly maximum as described afterwards. Such an automatic focusing circuit is disclosed for example in U.S. Pat. No. 4,638,364.

The focus lens device 2 in principle comprises a container 6 of a rectangular prism shape formed of a transparent material such as glass and a thin cylindrical lens member 7 of a polymer gel substance such as poly(acrylic amide) gel, the container 6 being filled with water-aceton mixture solution. Transparent electrodes 8 and 9 of tin oxide or indium tin oxide for example are formed on inner surfaces 6a and 6b of the container 6, parallel to the main surfaces of the lens member 7. The transparent electrodes 8 and 9 extend to outer surfaces 6c and 6d of the container 6, respectively, and accordingly even if the container 6 is filled with the water-aceton mixture solution and sealed with a cover 10, electric field can be formed in the container by application of voltage to the transparent electrodes 8 and 9. More specifically stated, the extended portions of the transparent electrodes 8 and 9 are connected to a voltage applying circuit 11 controlled by the automatic focusing circuit 5 and a positive potential and a negative potential are applied to the transparent electrodes 8 and 9, respectively.

Figure 2:
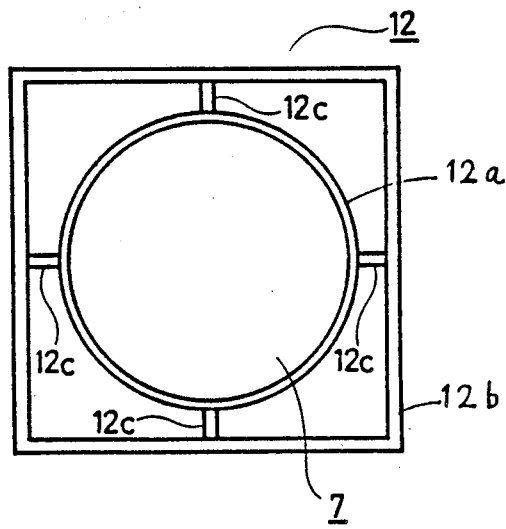
FIG. 2 is a front view showing a lens member and its support member in the focus adjusting apparatus shown in FIG. 1.

FIG. 2 is a front view of the lens member 7 and its support member 12 of the focus adjusting apparatus shown in FIG. 1. As shown in FIGS. 1 and 2, the lens member 7 in the water-aceton mixture solution has a thin cylindrical shape when voltage is not applied thereto and it has electro-reactive deformability. The lens member 7 is supported by the support member 12 formed of a material such as a teflon resin or silicone resin which hardly undergoes change of quality in an organic solvent. More specifically, the support member 12 is a shaped product including a ring portion 12a for holding the lens member 7, a frame member 12b fixed to the inner surfaces of the container 6 by adhesive or the like and four joint portions 12c for connecting those two portions 12a and 12b, as shown in FIG. 2.

Figure 3B:
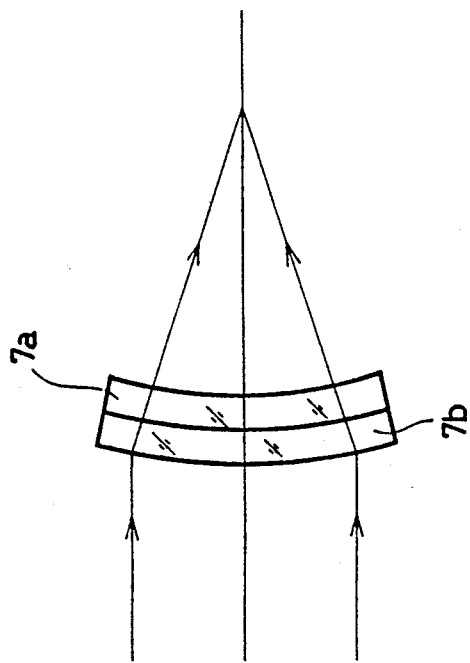
FIGS. 3A and 3B are typical sectional views of the lens member shown in FIG. 1.
Figure 3A:
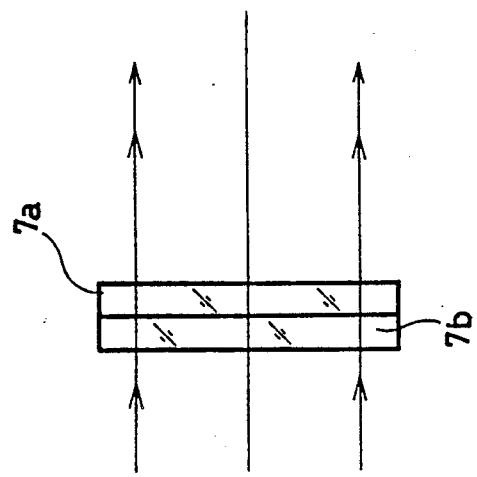

FIGS. 3A and 3B are typical sectional views of the lens member 7. As shown, the lens member 7 is practically a laminated member of two lens portions 7a and 7b of poly(acrylic amide) gel having acrylic acid group. The proportions of acrylic acid group contained in poly(acrylic amide) gel of the two lens portions 7a and 7b are different. The poly(acrylic amide) gel of the lens portion 7a on the side of the positive electrode 8 contains acrylic acid group of 20 mol %, while that of the other lens portion 7b contains acrylic acid group of a proportion smaller by about several percents.

In general, poly(acrylic amide) has a molecular structure as follows.

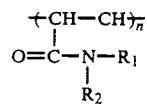

where substituents $R^1$ and $R^2$ can be replaced by various compounds, for example, in a manner of $R_1 \rightarrow H$, $R_2 \rightarrow CH_2-CH_3$ or $R_1 \rightarrow CH_3$, $R_2 \rightarrow CH_2-CH_3$.

The poly(acrylic amide) containing acrylic acid group of 20 mol % is represented as follows.

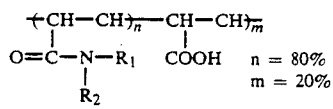

When poly(acrylic amide) containing acrylic acid group as indicated above is immersed in water-aceton mixture solution, the poly(acrylic amide) becomes a gel. At the same time, acrylic acid is dissociated in the solution (COOH→—COO⊖+H⊕, with the result that electric charges exist in the poly(acrylic amide) gel.

Aceton

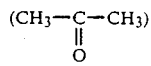

dissolves poly(acrylic amide), while water does not dissolve poly(acrylic amide). Thus, as a result of using the aceton-water mixture solution, poly(acrylic amide) is in a state in which half of it is dissolved and half of it is not dissolved, that is, in a gel state. The proportion of aceton in the solution is about 30 to 40% with respect to water. Instead of aceton, a substance belonging to ketone

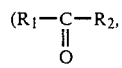

where $R_1 \rightarrow CH_3$, $R_2 \rightarrow CH_2CH_3$ for example) may be used.

Now, let us assume a case in which, in the focus lens device 2 of FIG. 1, a predetermined voltage is applied to the two transparent electrodes from the voltage applying circuit 11 so that the transparent electrode 8 is at a positive potential and the transparent electrode 9 is at a negative potential to generate electric field of about 5V/3 cm for example in the container 6. In this case, electric charges move due to the electric field generated in the container 6 and the electric charges in the lens member 7 of poly(acrylic amide) gel also move. As a result of the movement of the charges, the liquid in the poly(acrylic amide) gel is attracted and moved toward the charges. In consequence, the volume of the poly(acrylic amide) gel of the lens member 7 is decreased. At this time, the volume of the poly(acrylic amide) gel of the lens portion 7a on the side of the positive electrode 8 is more decreased because of the above described difference of the proportions of acrylic acid group in the lens portions 7a and 7b. Accordingly, the lens member 7 is deformed in a concentric spherical form as a whole as shown in FIG. 3B. Then, when the application of the voltage to the transparent electrodes 8 and 9 is stopped to remove the electric field in the container 6, the liquid returns into the poly(acrylic amide) gel and accordingly the lens member 7 returns to the initial form totally as shown in FIG. 3A. Thus, the focal distance of the lens member 7 changes according to degrees of such deformation.

The above described application of the predetermined voltage to the transparent electrodes 8 and 9 is effected by the voltage applying circuit 11 under the control of the automatic focusing circuit 5 so that an in-focus condition can be maintained. More specifically stated, the automatic focusing circuit 5 monitors the high-frequency component of the luminance signal from the converting circuit 4 and applies an output of the same level to the voltage applying circuit 11 as far as increase of the high-frequency component continues. For example, if a condition is set in the initial state of operation to output, from the automatic focusing circuit 5 to the voltage applying circuit 11, a control signal of high (H) level for instructing application of voltage to the transparent electrodes 8 and 9, the automatic focusing circuit 5 continuously outputs the signal of H level as far as the high-frequency component level increases. Thus, the lens member 7 becomes deformed in a concentric spherical form due to the electric field in the container 6 caused by the voltage from the voltage applying circuit 11 (as shown in FIG. 3B).

Then, the high-frequency component level attains a maximum value and when it is lowered by a predetermined value from the maximum value, the automatic focusing circuit 5 outputs a control signal of low (L) level and supplies it to the voltage applying circuit 11. The voltage applying circuit 11 stops the application of the voltage to the transparent electrodes 8 and 9 in response to this control signal of L level. Consequently, the electric field in the container disappears and the lens member 7 returns to the initial form (as shown in FIG. 3A).

The output of the control signal of L level from the automatic focusing circuit 5 continues until the high-frequency component level of the luminance signal having attained again the maximum value is lowered by a predetermined value from the maximum value. After that, the automatic focusing circuit 5 outputs again the control signal of H level, whereby electric field is generated in the container 6 and the lens member 7 begins again to be deformed in a concentric spherical form.

Thus, deformation of the lens member 7 is controlled by the automatic focusing circuit 5 so that a good in-focus condition can be constantly maintained.

In the above described embodiment, focusing control is performed by changing the focal distance of the lens member provided in the optical system for forming an image on a sensing area of the CCD. However, a zoom lens may be formed by using a polymer gel substance such as poly(acrylic amide) gel as in the above described embodiment.

The lens member does not need to be a laminate of two lens materials of poly(acrylic amide) gel as shown in FIGS. 3A and 3B. It may be formed by combining poly(acrylic amide) gel and a suitable transparent plate deformable.

As described in the foregoing, according to the above described embodiment, focus adjustment is effected by deformation of the lens member formed of a polymer gel substance such as poly(acrylic amide) gel having electro-reactive deformability and, consequently, it is not required to provide a complicated mechanism or a drive power source such as a motor for movement of the lens. Thus, the apparatus can be made small-sized and lightweight and consumption of electric power can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus adjusting apparatus comprising:
    an optical system including focus lens means formed of a polymer gel substance having electro-reactive deformability, said focus lens means having portions formed of said polymer gel substance with different deformable characteristics; and
    drive means for driving said focus lens means.

2. A focus adjusting apparatus in accordance with claim 1, wherein
    said focus lens means comprises
        a transparent container,
        a lens member formed of said polymer gel substance and fixed in said transparent container to cause an optical axis of said lens member to coincide with an optical axis of said optical system,
        a pair of transparent electrodes provided in said transparent container and facing said front and back surfaces of said lens member, respectively, said lens member having portions formed of said polymer gel substance with different deformable characteristics and
        an organic solution with which said transparent container is filled.

3. A focus adjusting apparatus in accordance with claim 2, wherein
    said lens member deforms in a concentric spherical form when voltage is applied thereto from said transparent electrodes and returns to an initial form when the application of the voltage is stopped.

4. A focus adjusting apparatus in accordance with claim 3, wherein
    said lens member is formed by laminating two thin cylindrical lens materials of poly(acrylic amide) gel having acrylic acid group along the optical axis, and
    said organic solution is a mixture solution containing water and aceton.

5. A focus adjusting apparatus in accordance with claim 3, wherein
    said lens member is formed by laminating a thin cylindrical lens material of poly(acrylic amide) gel having acrylic acid group and a deformable transparent plate along the optical axis, and
    said organic solution is a mixture solution containing water and aceton.

6. A focus adjusting apparatus in accordance with claim 4, wherein
    proportions of acrylic acid group contained in the poly(acrylic amide) gel of said two cylindrical lens materials are different.

7. A focus adjusting apparatus in accordance with claim 6, wherein
    the poly(acrylic amide) gel of the lens material facing the positive electrode out of said two cylindrical lens materials contains acrylic acid group of about 20 mol % and the poly(acrylic amide) gel of the lens material facing the negative electrode contains acrylic acid group of a portion substantially smaller than about 20 mol %.

8. A focus adjusting apparatus in accordance with claim 7, wherein
    a proportion of aceton with respect to water in said mixture solution containing water and aceton is about 30 to 40%.

9. A focus adjusting apparatus in accordance with claim 3, wherein
    said drive means comprises
        voltage applying means for applying voltage to said pair of transparent electrodes, and
        an automatic focusing circuit for controlling said voltage applying means in response to a video signal obtained from said optical system.

* * * * *